US012732619B2

(12) United States Patent
Lai et al.

(10) Patent No.: US 12,732,619 B2
(45) Date of Patent: Sep. 8, 2026

(54) METHOD AND APPARATUS OF DECODER-SIDE MOTION VECTOR REFINEMENT AND BI-DIRECTIONAL OPTICAL FLOW FOR VIDEO CODING

(71) Applicant: MEDIATEK INC., Hsinchu City (TW)

(72) Inventors: Chen-Yen Lai, Hsinchu City (TW); Tzu-Der Chuang, Hsinchu City (TW); Ching-Yeh Chen, Hsinchu City (TW); Chih-Wei Hsu, Hsinchu City (TW); Yu-Wen Huang, Hsinchu City (TW)

(73) Assignee: MEDIATEK INC., Hsin-Chu (TW)

( * ) Notice: Subject to any disclaimer, the term of this patent is extended or adjusted under 35 U.S.C. 154(b) by 52 days.

(21) Appl. No.: 18/864,768

(22) PCT Filed: May 16, 2023

(86) PCT No.: PCT/CN2023/094597
§ 371 (c)(1),
(2) Date: Nov. 11, 2024

(87) PCT Pub. No.: WO2023/221993
PCT Pub. Date: Nov. 23, 2023

(65) Prior Publication Data

US 2025/0350735 A1 Nov. 13, 2025

Related U.S. Application Data

(60) Provisional application No. 63/367,821, filed on Jul. 7, 2022, provisional application No. 63/342,180, filed on May 16, 2022.

(51) Int. Cl.
*H04N 19/00* (2014.01)
*H04N 19/105* (2014.01)
(Continued)

(52) U.S. Cl.
CPC ......... *H04N 19/137* (2014.11); *H04N 19/105* (2014.11); *H04N 19/159* (2014.11); *H04N 19/172* (2014.11); *H04N 19/176* (2014.11)

(58) Field of Classification Search
CPC ..................................................... H04N 19/00
See application file for complete search history.

(56) References Cited

U.S. PATENT DOCUMENTS 11,936,904 B2 3/2024 Liu
2020/0374550 A1 11/2020 Huang
(Continued)

FOREIGN PATENT DOCUMENTS

CN 114342379 A 4/2022
CN 114365500 A 4/2022
(Continued)

OTHER PUBLICATIONS

International Search Report and Written Opinion dated Jul. 5, 2023, issued in application No. PCT/CN2023/094597.
(Continued)

*Primary Examiner* — Maryam A Nasri
(74) *Attorney, Agent, or Firm* — McClure, Qualey & Rodack, LLP

(57) ABSTRACT

Method and apparatus of using bi-directional prediction to refine MV are disclosed. According to one method, a sample-based refinement and a subblock-based refinement are determined for the current block. A final refinement for the current block is determined based on the sample-based refinement and the subblock-based refinement. According to another method, one or more high-level syntaxes are signalled or parsed, where the high-level syntaxes indicate whether non-equal distance reference pictures are allowed for bi-directional motion refinement. In response to the high-level syntaxes indicating the non-equal distance refer-
(Continued)

ence pictures being allowed, a refined MV is determined for at least one block in the current picture based on a reference picture in list 0 and a reference picture in list 1, where the picture distance between the first reference picture and the current picture and the picture distance between the second reference picture and the current picture are different.

13 Claims, 5 Drawing Sheets

(51) Int. Cl.

| | |
|---|---|
| ***H04N 19/137*** | (2014.01) |
| ***H04N 19/159*** | (2014.01) |
| ***H04N 19/172*** | (2014.01) |
| ***H04N 19/176*** | (2014.01) |

(56) References Cited

U.S. PATENT DOCUMENTS

2022/0086493 A1 3/2022 Francois et al.
2022/0109871 A1 4/2022 Galpin et al.
2022/0150507 A1* 5/2022 Lin ...................... H04N 19/577
2022/0182659 A1 6/2022 Xiu
2022/0377371 A1* 11/2022 Liu ...................... H04N 19/132

FOREIGN PATENT DOCUMENTS

WO 2020182216 A1 9/2020
WO 2021006617 A1 1/2021

OTHER PUBLICATIONS

EP Office Action dated Feb. 20, 2026 in EP application No. 23806944.7-1207.
Alshin Alexander, et al.; "Bi-directional Optical Flow for Future Video Codec" (retrieved on Dec. 15, 2016);.

* cited by examiner

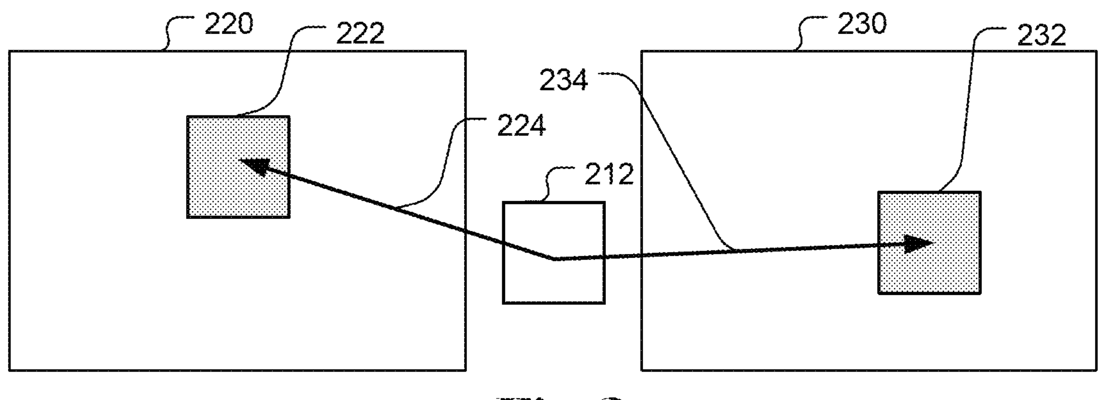
*Fig. 2*
220
222
224
212
230
232
234
324
334
322
332
*Fig. 3*
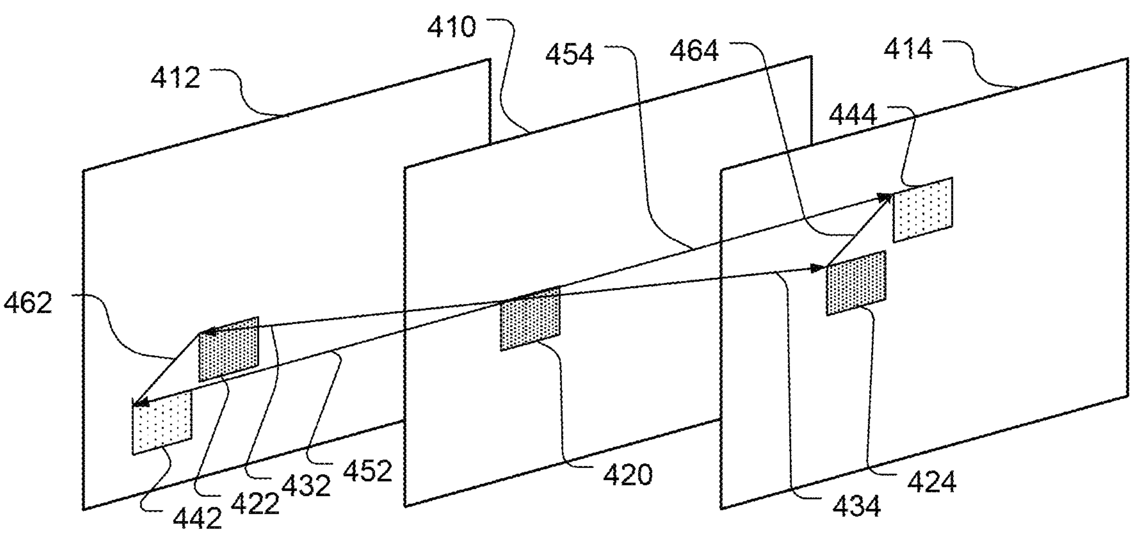
*Fig. 4*

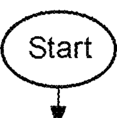

Receiving input data associated with a current block, wherein the input data comprise pixel data for the current block to be encoded at an encoder side or coded data associated with the current block to be decoded at a decoder side, and where the current block is coded using bi-directional prediction — 710

Signalling or parsing one or more high-level syntaxes, wherein said one or more high-level syntaxes indicate whether non-equal distance reference pictures are allowed for bi-directional motion refinement — 720

In response to said one or more high-level syntaxes indicating the non-equal distance reference pictures being allowed, deriving a refined MV (Motion Vector) for at least one block in the current picture based on a first reference picture in list 0 and a second reference picture in list 1, and wherein a first picture distance between the first reference picture and the current picture and a second picture distance between the second reference picture and the current picture are different — 730

Encoding or decoding said at least one block by using prediction information comprising the refined MV — 740

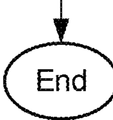

*Fig. 7*

METHOD AND APPARATUS OF DECODER-SIDE MOTION VECTOR REFINEMENT AND BI-DIRECTIONAL OPTICAL FLOW FOR VIDEO CODING

CROSS REFERENCE TO RELATED APPLICATIONS

The present invention claims priority to U.S. Provisional Patent Application, Ser. No. 63/342,180, filed on May 16, 2022 and U.S. Provisional Patent Application, Ser. No. 63/367,821, filed on Jul. 7, 2022. The U.S. Provisional Patent Applications are hereby incorporated by reference in their entireties.

FIELD OF THE INVENTION

The present invention relates to bi-directional prediction for MV refinement based on DMVR (Decoder-Side Motion Vector Refinement) or BDOF (Bi-Directional Optical Flow).

BACKGROUND AND RELATED ART

Versatile video coding (VVC) is the latest international video coding standard developed by the Joint Video Experts Team (JVET) of the ITU-T Video Coding Experts Group (VCEG) and the ISO/IEC Moving Picture Experts Group (MPEG). The standard has been published as an ISO standard: ISO/IEC 23090-3:2021, Information technology-Coded representation of immersive media-Part 3: Versatile video coding, published February 2021. VVC is developed based on its predecessor HEVC (High Efficiency Video Coding) by adding more coding tools to improve coding efficiency and also to handle various types of video sources including 3-dimensional (3D) video signals.

FIG. 1A illustrates an exemplary adaptive Inter/Intra video coding system incorporating loop processing. For Intra Prediction, the prediction data is derived based on previously coded video data in the current picture. For Inter Prediction 112, Motion Estimation (ME) is performed at the encoder side and Motion Compensation (MC) is performed based of the result of ME to provide prediction data derived from other picture(s) and motion data. Switch 114 selects Intra Prediction 110 or Inter-Prediction 112 and the selected prediction data is supplied to Adder 116 to form prediction errors, also called residues. The prediction error is then processed by Transform (T) 118 followed by Quantization (Q) 120. The transformed and quantized residues are then coded by Entropy Encoder 122 to be included in a video bitstream corresponding to the compressed video data. The bitstream associated with the transform coefficients is then packed with side information such as motion and coding modes associated with Intra prediction and Inter prediction, and other information such as parameters associated with loop filters applied to underlying image area. The side information associated with Intra Prediction 110, Inter prediction 112 and in-loop filter 130, are provided to Entropy Encoder 122 as shown in FIG. 1A. When an Inter-prediction mode is used, a reference picture or pictures have to be reconstructed at the encoder end as well. Consequently, the transformed and quantized residues are processed by Inverse Quantization (IQ) 124 and Inverse Transformation (IT) 126 to recover the residues. The residues are then added back to prediction data 136 at Reconstruction (REC) 128 to reconstruct video data. The reconstructed video data may be stored in Reference Picture Buffer 134 and used for prediction of other frames.

As shown in FIG. 1A, incoming video data undergoes a series of processing in the encoding system. The reconstructed video data from REC 128 may be subject to various impairments due to a series of processing. Accordingly, in-loop filter 130 is often applied to the reconstructed video data before the reconstructed video data are stored in the Reference Picture Buffer 134 in order to improve video quality. For example, deblocking filter (DF), Sample Adaptive Offset (SAO) and Adaptive Loop Filter (ALF) may be used. The loop filter information may need to be incorporated in the bitstream so that a decoder can properly recover the required information. Therefore, loop filter information is also provided to Entropy Encoder 122 for incorporation into the bitstream. In FIG. 1A, Loop filter 130 is applied to the reconstructed video before the reconstructed samples are stored in the reference picture buffer 134. The system in FIG. 1A is intended to illustrate an exemplary structure of a typical video encoder. It may correspond to the High Efficiency Video Coding (HEVC) system, VP8, VP9, H.264 or VVC.

The decoder, as shown in FIG. 1B, can use similar or portion of the same functional blocks as the encoder except for Transform 118 and Quantization 120 since the decoder only needs Inverse Quantization 124 and Inverse Transform 126. Instead of Entropy Encoder 122, the decoder uses an Entropy Decoder 140 to decode the video bitstream into quantized transform coefficients and needed coding information (e.g. ILPF information, Intra prediction information and Inter prediction information). The Intra prediction 150 at the decoder side does not need to perform the mode search. Instead, the decoder only needs to generate Intra prediction according to Intra prediction information received from the Entropy Decoder 140. Furthermore, for Inter prediction, the decoder only needs to perform motion compensation (MC 152) according to Inter prediction information received from the Entropy Decoder 140 without the need for motion estimation.

According to VVC, an input picture is partitioned into non-overlapped square block regions referred as CTUs (Coding Tree Units), similar to HEVC. Each CTU can be partitioned into one or multiple smaller size coding units (CUs). The resulting CU partitions can be in square or rectangular shapes. Also, VVC divides a CTU into prediction units (PUs) as a unit to apply prediction process, such as Inter prediction, Intra prediction, etc.

The VVC standard incorporates various new coding tools to further improve the coding efficiency over the HEVC standard. Furthermore, various new coding tools (for example, Decoder-Side Motion Vector Refinement (DMVR), Bi-directional Optical Flow (BDOF), and some other coding tools) have been proposed for consideration in the development of a new coding standard beyond the VVC.

In the present invention, methods to improve the coding efficiency related to DMVR and BDOF are disclosed.

BRIEF SUMMARY OF THE INVENTION

Method and apparatus of motion vector refinement using bi-directional prediction are disclosed. According to one method of the present invention, input data associated with a current block in a current picture are received, where the current block is coded using bi-directional prediction. A sample-based refinement for the current block is determined, where each sample of the sample-based refinement is derived based on a first sample in a first reference picture in list 0 and a second sample in a second reference picture in list 1. A subblock-based refinement for the current block is determined, where each subblock of the subblock-based refinement is derived based on a first subblock in the first reference picture in the list 0 and a second subblock in the second reference picture in the list 1. A final refinement is determined for the current block based on the sample-based refinement and the subblock-based refinement. The current block is encoded or decoded by using prediction information comprising the final refinement.

In one embodiment, the final refinement corresponds to a weighted sum of the sample-based refinement and the subblock-based refinement. In one embodiment, one or more weights for the weighted sum of the sample-based refinement and the subblock-based refinement are pre-determined. In another embodiment, one or more weights for the weighted sum of the sample-based refinement and the subblock-based refinement are signalled at the encoder side or parsed at the decoder side. For example, one or more syntax related to said one or more weights can be signalled or parsed at a CU (Coding Unit) level or a CTU (Coding Tree Unit) level.

In one embodiment, the final refinement is selected between the sample-based refinement and the subblock-based refinement. In one embodiment, if the subblock-based refinement cannot be derived, the sample-based refinement is selected as the final refinement. In another embodiment, if the sample-based refinement cannot be derived, the subblock-based refinement is selected as the final refinement. In one embodiment, if a magnitude of motion refinement associated with the sample-based refinement is smaller than that associated with the subblock-based refinement, the subblock-based refinement is selected as the final refinement. In another embodiment, if a magnitude of motion refinement associated with the subblock-based refinement is smaller than that associated with the sample-based refinement, the sample-based refinement is selected as the final refinement.

In one embodiment, a high-level syntax is signalled at the encoder side or parsed at the decoder side, wherein the high-level syntax indicates whether the final refinement is allowed to be derived based on the sample-based refinement and the subblock-based refinement. In one embodiment, the high-level syntax is signalled at the encoder side or parsed at the decoder side in a slice level, picture level or sequence level. In one embodiment, if the high-level syntax equals to a first value, either the subblock-based refinement or the sample-based refinement is selected as the final refinement. In another embodiment, if the high-level syntax equals to a second value, both of the subblock-based refinement or the sample-based refinement are used to derive the final refinement. In one embodiment, a first motion refinement associated with the subblock-based refinement is derived from a second motion refinement associated with multiple samples of the sample-based refinement.

According to another method, one or more high-level syntaxes are signalled or parsed, wherein said one or more high-level syntaxes indicate whether non-equal distance reference pictures are allowed for bi-directional motion refinement. In response to said one or more high-level syntaxes indicating the non-equal distance reference pictures being allowed, a refined MV (Motion Vector) is derived for at least one block in the current picture based on a first reference picture in list 0 and a second reference picture in list 1, and wherein a first picture distance between the first reference picture and the current picture and a second picture distance between the second reference picture and the current picture are different. Said at least one block is encoded or decoded by using prediction information comprising the refined MV.

In one embodiment, said one or more high-level syntaxes comprise a first high-level syntax to indicate whether the non-equal distance reference pictures are allowed for the bi-directional motion refinement based on DMVR (Decoder-Side Motion Vector Refinement) and a second high-level syntax to indicate whether the non-equal distance reference pictures are allowed for the bi-directional motion refinement based on BDOF (Bi-Directional Optical Flow). In one embodiment, said one or more high-level syntaxes are signalled in or parsed from a SPS (Sequence Parameter Set). In another embodiment, one or more low-level syntaxes are signalled or parsed to indicate whether the non-equal distance reference pictures are allowed for bi-directional motion refinement at a lower level. For example, said one or more low-level syntaxes can be signalled or parsed at a picture level or a slice level. In another embodiment, said one or more low-level syntaxes are signalled or parsed only in response to said one or more high-level syntaxes indicating the non-equal distance reference pictures being allowed.

BRIEF DESCRIPTION OF THE DRAWINGS

FIG. 2 is a diagram illustrating an embodiment showing a template generated by using the bi-prediction from the reference blocks (blocks 222 and 232) of MV0 224 and MV1 234 respectively.

FIG. 3 is a diagram illustrating an embodiment showing a template used as a new current block and the motion estimation performed to find a better matching block in Ref. Picture 0 and Ref. Picture 1, respectively.

FIG. 4 is a diagram illustrating an embodiment showing a bilateral-matching (BM) based decoder side motion vector refinement.

FIG. 7 illustrates an exemplary flowchart of a video coding (for example, encoding and/or decoding) system using bi-directional prediction to refine predictor for a bi-direction predicted block according to an embodiment of the present invention.

DETAILED DESCRIPTION OF THE INVENTION

Figure 1A:
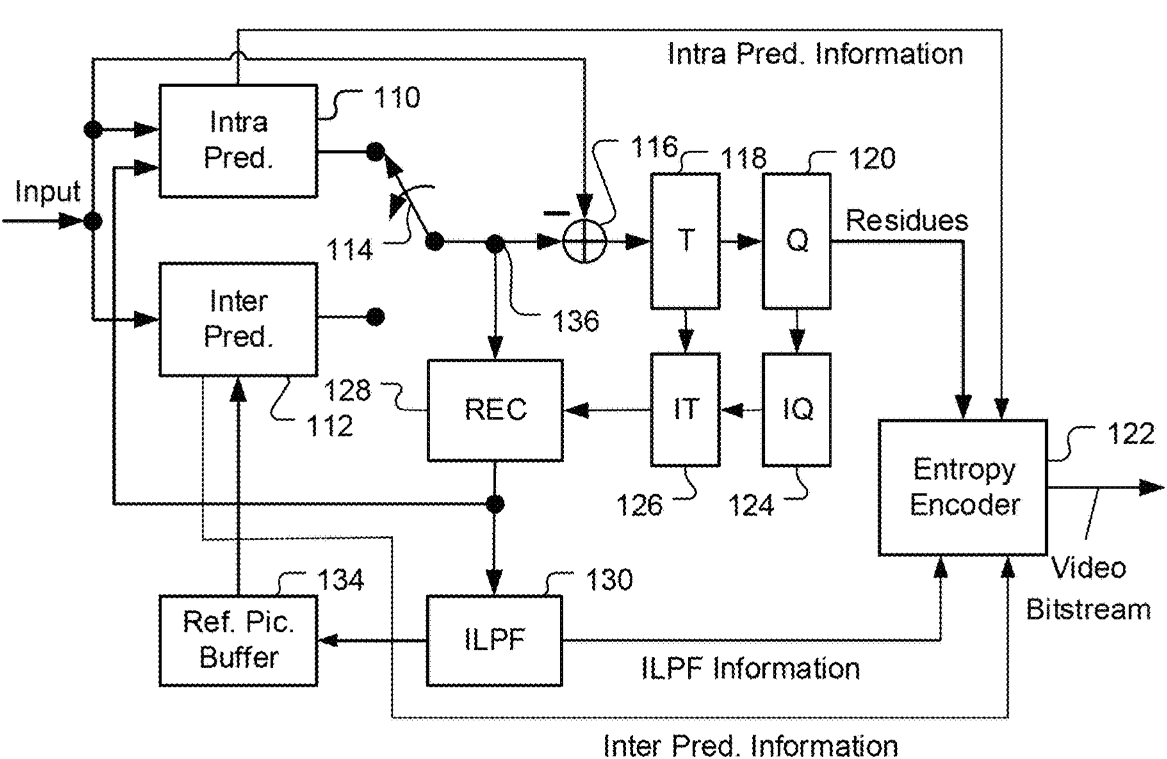
FIG. 1A illustrates an exemplary adaptive Inter/Intra video coding system incorporating loop processing.

It will be readily understood that the components of the present invention, as generally described and illustrated in the figures herein, may be arranged and designed in a wide variety of different configurations. Thus, the following more detailed description of the embodiments of the systems and methods of the present invention, as represented in the figures, is not intended to limit the scope of the invention, as claimed, but is merely representative of selected embodiments of the invention. References throughout this specification to “one embodiment,” “an embodiment,” or similar language mean that a particular feature, structure, or characteristic described in connection with the embodiment may be included in at least one embodiment of the present invention. Thus, appearances of the phrases "in one embodiment" or "in an embodiment" in various places throughout this specification are not necessarily all referring to the same embodiment.

Furthermore, the described features, structures, or characteristics may be combined in any suitable manner in one or more embodiments. One skilled in the relevant art will recognize, however, that the invention can be practiced without one or more of the specific details, or with other methods, components, etc. In other instances, well-known structures, or operations are not shown or described in detail to avoid obscuring aspects of the invention. The illustrated embodiments of the invention will be best understood by reference to the drawings, wherein like parts are designated by like numerals throughout. The following description is intended only by way of example, and simply illustrates certain selected embodiments of apparatus and methods that are consistent with the invention as claimed herein.

Decoder-Side Motion Vector Refinement (DMVR)

In JVET-D0029 (Xu Chen, et al., "Decoder-Side Motion Vector Refinement Based on Bilateral Template Matching", in Joint Video Exploration Team (JVET) of ITU-T SG 16 WP 3 and ISO/IEC JTC 1/SC 29/WG 11, 4th Meeting: Chengdu, CN, 15-21 Oct. 2016, Document: JVET-D0029), Decoder-Side Motion Vector Refinement (DMVR) based on bilateral template matching is disclosed. A template is generated by using the bi-prediction from the reference blocks (blocks 222 and 232) of MV0 224 and MV1 234 respectively, as shown in FIG. 2, where block 212 corresponds to a current block, reference block 222 is located in reference picture 0 (220) and reference block 232 is located in reference picture 1 (230). The template is used as a new current block and the motion estimation is performed to find a better matching block in Ref. Picture 0 and Ref. Picture 1, respectively, as shown in FIG. 3. The refined MVs are the MV0' (324) and MV1' (334). Then the refined MVs (MV0' and MV1') are used to generate a final bi-predicted prediction block for the current block. In FIG. 3, reference blocks 322 and 332 are located according to the refined MV0' (324) and MV1' (334) respectively.

Multi-Pass Decoder-Side Motion Vector Refinement (MP-DMVR)

In order to increase the accuracy of the MVs of the merge mode, a bilateral-matching (BM) based decoder side motion vector refinement is applied in VVC. In bi-prediction operation, a refined MV is searched around the initial MVs (432 and 434) in the reference picture list L0 412 and reference picture list L1 414 for a current block 420 the current picture 410. The collocated blocks 422 and 424 in L0 and L1 are determined according to the initial MVs 430 and 432) and the location of the current block 420 in the current picture as shown in FIG. 4. The BM method calculates the distortion between the two candidate blocks (442 and 444) in the reference picture list L0 and list L1. The locations of the two candidate blocks (442 and 444) are determined by adding two opposite offset (462 and 464) to the two initial MVs (432 and 434) to derive the two candidate MVs (452 and 454). As illustrated in FIG. 4, the SAD between the candidate blocks (442 and 444) based on each MV candidate around the initial MV (432 or 434) is calculated. The MV-candidate (452 or 454) with the lowest SAD becomes the refined MV and used to generate the bi-predicted signal.

In ECM-2.0, a Multi-Pass (MP) DMVR method is applied in regular merge mode if the selected merge candidate meets the DMVR conditions. In the first pass, bilateral matching (BM) is applied to the coding block. In the second pass, BM is applied to each 16×16 subblock within the coding block. In the third pass, MV in each 8×8 subblock is refined by applying bi-directional optical flow (BDOF).

Similar to the DMVR in VVC, the BM refined a pair of motion vectors MV0 and MV1 under the constrain that MVD0 (MV0'-MV0) is just the opposite sign of MVD1 (MV1'-MV1), as in FIG. 4.

Bi-Directional Optical Flow (BIO)

Figure 5:
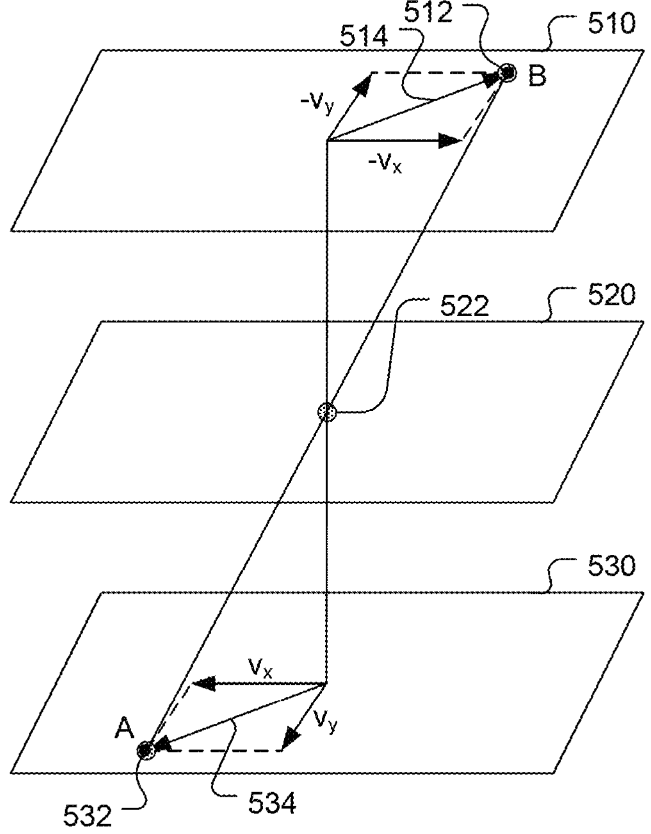
FIG. 5 is a diagram illustrating an embodiment showing BIO deriving the sample-level motion refinement based on the assumptions of optical flow and steady motion.

Bi-directional optical flow (BIO or BDOF) is motion estimation/compensation technique disclosed in JCTVC-C204 (E. Alshina, et al., Bi-directional optical flow, Joint Collaborative Team on Video Coding (JCT-VC) of ITU-T SG 16 WP 3 and ISO/IEC JTC 1/SC 29/WG 11, 3rd Meeting: Guangzhou, CN, 7-15 Oct. 2010, Document: JCTVC-C204) and VCEG-AZ05 (E. Alshina, et al., *Known tools performance investigation for next generation video coding*, ITU-T SG 16 Question 6, Video Coding Experts Group (VCEG), 52$^{nd}$ Meeting: 19-26 Jun. 2015, Warsaw, Poland, Document: VCEG-AZ05). BIO derived the sample-level motion refinement based on the assumptions of optical flow and steady motion as shown in FIG. 5, where a current pixel 522 in a B-slice (bi-prediction slice) 520 is predicted by one pixel (532) in reference picture 0 (530) and one pixel (512) in reference picture 1 (510). As shown in FIG. 5, the current pixel 522 is predicted by pixel B 512 in reference picture 1 (510) and pixel A 532 in reference picture 0 (530). In FIG. 5, $v_x$ and $v_y$ are pixel displacement vector in the x-direction and y-direction, which are derived using a bi-directional optical flow (BIO) model. It is applied only for truly bi-directional predicted blocks, which is predicted from two reference pictures corresponding to the previous picture and the latter picture. In VCEG-AZ05, BIO utilizes a 5×5 window to derive the motion refinement of each sample. Therefore, for an N×N block, the motion compensated results and corresponding gradient information of an (N+4)×(N+4) block are required to derive the sample-based motion refinement for the N×N block. According to VCEG-AZ05, a 6-Tap gradient filter and a 6-Tap interpolation filter are used to generate the gradient information for BIO. Therefore, the computational complexity of BIO is much higher than that of traditional bi-directional prediction. In order to further improve the performance of BIO, the following methods are proposed.

In a conventional bi-prediction in HEVC, the predictor is generated using equation (1), where $p^{(0)}$ and $p^{(1)}$ are the list0 and list1 predictor, respectively.

$$P_{Conventional}[i,j]=\left(P^{(0)}[i,j]+P^{(1)}[i,j]+1\right)>>1 \tag{1}$$

In JCTVC-C204 and VECG-AZ05, the BIO predictor is generated using equation (2).

$$P_{OpticalFlow}=\left(P^{(0)}[i,j]+P^{(1)}[i,j]+v_x[i,j]\left(I_x^{(0)}-I_x^{(1)}[i,j]\right)+v_y[i,j]\left(I_y^{(0)}-I_y^{(1)}[i,j]\right)+1\right)>>1 \tag{2}$$

In equation (2), $I_x^{(0)}$ and $I_x^{(1)}$ (represent the x-directional gradient in list0 and list1 predictor, respectively; $I_y^{(0)}$ and $I_y^{(1)}$ represent the y-directional gradient in list0 and list1 predictor, respectively; $v_x$ and $v_y$ represent the offsets or displacements in x- and y-direction, respectively. The derivation process of $v_x$ and $v_y$ is shown in the following. First, the cost function is defined as diffCost(x, y) to find the best values $v_x$ and $v_y$. In order to find the best values $v_x$ and $v_y$ to minimize the cost function, diffCost(x, y), one 5×5 window is used. The solutions of $v_x$ and $v_y$ can be represented by using $S_1$, $S_2$, $S_3$, $S_5$, and $S_6$.

$$\begin{aligned} diffCost(x, y) &= \sum_{\Omega}\left(P^0(x, y) + v_x\frac{\partial P^0(x, y)}{\partial x} + v_y\frac{\partial P^0(x, y)}{\partial y} - \left(P^1(x, y) - v_x\frac{\partial P^1(x, y)}{\partial x} - v_y\frac{\partial P^1(x, y)}{\partial y}\right)\right)^2, \\ &= \sum_{\Omega}\left(P^0(x, y) - P^1(x, y) + v_x\left(\frac{\partial P^0(x, y)}{\partial x} + \frac{\partial P^1(x, y)}{\partial x}\right) + v_y\left(\frac{\partial P^0(x, y)}{\partial y} + \frac{\partial P^1(x, y)}{\partial y}\right)\right)^2. \end{aligned} \tag{3}$$

The minimum cost function, min diff Cost(x, y) can be derived according to:

$$\frac{\partial diffCost(x, y)}{\partial v_x} = 0, \frac{\partial diffCost(x, y)}{\partial v_Y} = 0. \tag{4}$$

By solving equations (3) and (4), $v_x$ and $v_y$ can be solved according to eqn. (5):

$$v_x = \frac{S_3S_5 - S_2S_6}{S_1S_5 - S_2S_2}, v_y = \frac{S_1S_6 - S_3S_2}{S_1S_5 - S_2S_2} \tag{5}$$

where, $$S_1 = \sum_{\Omega}\left(\frac{\partial P^0(x, y)}{\partial x} + \frac{\partial P^1(x, y)}{\partial x}\right)^2,$$

$$S_2 = \sum_{\Omega}\left(\frac{\partial P^0(x, y)}{\partial x} + \frac{\partial P^1(x, y)}{\partial x}\right)\left(\frac{\partial P^0(x, y)}{\partial y} + \frac{\partial P^1(x, y)}{\partial y}\right)$$

$$S_3 = -\sum_{\Omega}\left(\frac{\partial P^0(x, y)}{\partial x} + \frac{\partial P^1(x, y)}{\partial x}\right)\left(P^0(x, y) - P^1(x, y)\right),$$

$$S_5 = \sum_{\Omega}\left(\frac{\partial P^0(x, y)}{\partial y} + \frac{\partial P^1(x, y)}{\partial y}\right)^2$$

$$S_6 = -\sum_{\Omega}\left(\frac{\partial P^0(x, y)}{\partial y} + \frac{\partial P^1(x, y)}{\partial y}\right)\left(P^0(x, y) - P^1(x, y)\right).$$

In the above equations, $$\frac{\partial P^0(x, y)}{\partial x}$$

corresponds to the x-direction gradient of a pixel at (x,y) in the list 0 picture, $$\frac{\partial P^1(x, y)}{\partial x}$$

corresponds to the x-direction gradient of a pixel at (x,y) in the list 1 picture, $$\frac{\partial P^0(x, y)}{\partial y}$$

corresponds to the y-direction gradient of a pixel at (x,y) in the list 0 picture, and $$\frac{\partial P^1(x, y)}{\partial y}$$

corresponds to the y-direction gradient of a pixel at (x,y) in the list 1 picture.

In some related art, the $S_2$ can be ignored, and $v_x$ and $v_y$ can be solved according to $$v_x = \frac{S_3}{S_1}, v_y = \frac{S_6 - v_xS_2}{S_5} \tag{6}$$

where, $$S_1 = \sum_{\Omega}\left(\frac{\partial P^0(x, y)}{\partial x} + \frac{\partial P^1(x, y)}{\partial x}\right)^2,$$

$$S_2 = \sum_{\Omega}\left(\frac{\partial P^0(x, y)}{\partial x} + \frac{\partial P^1(x, y)}{\partial x}\right)\left(\frac{\partial P^0(x, y)}{\partial y} + \frac{\partial P^1(x, y)}{\partial y}\right)$$

$$S_3 = -\sum_{\Omega}\left(\frac{\partial P^0(x, y)}{\partial x} + \frac{\partial P^1(x, y)}{\partial x}\right)\left(P^0(x, y) - P^1(x, y)\right),$$

$$S_5 = \sum_{\Omega}\left(\frac{\partial P^0(x, y)}{\partial y} + \frac{\partial P^1(x, y)}{\partial y}\right)^2$$

$$S_6 = -\sum_{\Omega}\left(\frac{\partial P^0(x, y)}{\partial y} + \frac{\partial P^1(x, y)}{\partial y}\right)\left(P^0(x, y) - P^1(x, y)\right)$$

In JVET-M1001 (Benjamin Bross, et al., "Versatile Video Coding (Draft 4)", in Joint Video Exploration Team (JVET) of ITU-T SG 16 WP 3 and ISO/IEC JTC 1/SC 29/WG 11, 13th Meeting: Marrakech, MA, 9-18 Jan. 2019, Document: JVET-M1001), the block-based BIO process is performed, and the block size is 4×4. Moreover, in order to reduce the computation complexity of BIO, two early termination mechanisms are utilized. For one CU, the sum of absolute differences (SAD) between two predictors (one from L0 and one from L1) is calculated first. If the SAD is smaller than one threshold, then BIO process is skipped. Otherwise, BIO process is applied to the current CU. If BIO is applied to the current CU, then the sum of absolute differences (SAD) between two predictors (one from L0 and one from L1) in one 4×4 block is calculated and applying BIO to the current 4×4 block or not depends on the SAD of one 4×4 block.

In JVET-Z2025 (Muhammed Coban, et al., "Algorithm description of Enhanced Compression Model 5 (ECM 5)", in Joint Video Exploration Team (JVET) of ITU-T SG 16 WP 3 and ISO/IEC JTC 1/SC 29/WG 11, 26th Meeting, by teleconference, 20-29 Apr. 2022, Document: JVET-Z2025), sample-based BDOF is utilized. In the sample-based BDOF, instead of deriving motion refinement (Vx, Vy) on a block basis, it is performed per sample. The coding block is divided into 8×8 subblocks. For each subblock, whether to apply BDOF or not is determined by checking the SAD between the two reference subblocks against a threshold. If decided to apply BDOF to a subblock, for every sample in the subblock, a sliding 5×5 window is used and the existing BDOF process is applied for every sliding window to derive Vx and Vy. The derived motion refinement (Vx, Vy) is applied to adjust the bi-predicted sample value for the center sample of the window.

To increase the flexibility and/or coding efficiency of DMVR and BDOF, it is proposed to signal a high level flag to indicate whether a bi-prediction motion with non-equal distance reference pictures can be refined with DMVR and BDOF.

In one embodiment, a flag can be signalled in sequence parameter set (SPS), and it is used to indicate whether non-equal distance bi-prediction is allowed to refine by DMVR and BDOF. In another embodiment, two flags are signalled. One is used to indicate whether non-equal distance bi-prediction is allowed to refine by DMVR. The other is used to indicate whether non-equal distance bi-prediction is allowed to refine by BDOF. In another embodiment, a flag can be signalled in the picture header or slice header. In another embodiment, two flags can be signalled. One is used for DMVR, such as ph_dmvr_non_equal_refine or sh_dmvr_non_equal_refine in the picture head or the slice header. The other is used for BDOF, such as ph_bdof_non_equal_refine or sh_bdof_non_equal_refine in the picture head or the slice header.

In another embodiment, a higher level syntax, such as sps_non_equal_refine_enable, is signalled. Only if the high level syntax is true, the lower level related syntax, such as ph_non_equal_refine_enable, ph_dmvr_non_equal_refine, sh_dmvr_non_equal_refine, ph_bdof_non_equal_refine, or sh_bdof_non_equal_refine, can be signalled. In another embodiment, a higher level syntax, such as sps_non_equal_refine_enable, is signalled. Only if the high level syntax is true, the lower level related syntax, such as ph_non_equal_refine_enable, ph_dmvr_non_equal_refine, sh_dmvr_non_equal_refine, ph_bdof_non_equal_refine, or sh_bdof_non_equal_refine, can be signalled. Additionally, if the related syntax, such as ph_dmvr_non_equal_refine or ph_bdof_non_equal_refine, are signalled in the picture header, the related syntax signalled in the slice header (e.g. sh_dmvr_non_equal_refine or sh_bdof_non_equal_refine) will not be signalled. In other words, only if the related syntax (e.g. ph_dmvr_non_equal_refine or ph_bdof_non_equal_refine) is not present in the picture header, the related syntax in the slice header (e.g. sh_dmvr_non_equal_refine or sh_bdof_non_equal_refine) can be signalled.

In the related art, either sample-based BDOF or block-based BDOF is utilized. In order to further improve the performance of BDOF, we proposed to utilize sample-based BDOF and block-based BDOF together in the following. The final output is derived according to the outputs of sample-based BDOF and block-based BDOF. Moreover, since the gradients of one to-be-processed sample are the same in sample-based BDOF and block-based BDOF, we can directly combine sample-based motion refinement and block-based motion refinement instead of combining the outputs of sample-based BDOF and block-based BDOF. The derivation process of the final output can be linear operations or non-linear operations.

In one embodiment, the final output is the weighted sum of the outputs of sample-based BDOF and block-based BDOF. The weight can be pre-determined or signalled at some specific level, such as the coding unit (CU) level, coding tree unit (CTU) level, slice level, picture level, or sequence level. The weight can be pre-determined according to the QP, video resolution, CU size, temporal ID, reference picture selection, temporal distance between reference picture and current picture, and so on. Since the gradients of one to-be-processed sample are the same in sample-based BDOF and block-based BDOF, we can directly combine sample-based motion refinement and block-based motion refinement instead of combining the outputs of sample-based BDOF and block-based BDOF.

In one embodiment, the final output is selected from one of the outputs of sample-based BDOF and block-based BDOF. For example, in one embodiment, if the motion refinement cannot be determined in sample-based BDOF (e.g. dividing by zero), the output of block-based BDOF is selected. Otherwise, the output of sample-based BDOF is selected. In another embodiment, if the motion refinement cannot be determined in block-based BDOF (e.g. dividing by zero), the output of sample-based BDOF is selected. Otherwise, the output of block-based BDOF is selected.

In one embodiment, the final output is selected from one of the outputs of sample-based BDOF and block-based BDOF according to the sample-based motion refinement and block-based motion refinement. For example, if the magnitude of sample-based motion refinement is smaller than that of block-based motion refinement, the output of block-based BDOF is selected. Otherwise, the output of sample-based BDOF is selected. In another example, if the magnitude of sample-based motion refinement is greater than that of block-based motion refinement, the output of block-based BDOF is selected. Otherwise, the output of sample-based BDOF is selected. The magnitude of motion refinement can be the sum of absolute values of motion refinement in the x and y dimensions, the absolute value of the product of motion refinement in the x and y dimensions, or the sum of squares of motion refinement in the x and y dimensions. In another embodiment, the final output is selected from one of the outputs of sample-based BDOF and block-based BDOF according to the motion directions of sample-based motion refinement and block-based motion refinement. If the motion direction of sample-based motion refinement is different to that of block-based motion refinement, the output of block-based BDOF is selected. Otherwise, the output of sample-based BDOF is selected. In another example, If the motion direction of sample-based motion refinement is the same as that of block-based motion refinement, the output of block-based BDOF is selected. Otherwise, the output of sample-based BDOF is selected. The judgement of the same motion direction or not can be determined by the product of two motion refinements is smaller than zero. If both products in the x and y dimensions of two sample-based motion refinement and block-based sample-based motion refinement are greater than or equal to zero, it is treated as the same motion direction. Otherwise, it is treated as different motion directions. In another embodiment, the decisions of the same motion direction or not are made in the x and y dimensions, independently.

In one embodiment, the final output is selected from one of the outputs of sample-based BDOF and block-based BDOF according to the collected statistical data used in sample-based BDOF and block-based BDOF. For example, if the denominator of sample-based BDOF is smaller than that of block-based BDOF, the output of block-based BDOF is selected. Otherwise, the output of sample-based BDOF is selected. In another example, if the denominator of sample-based BDOF is greater than that of block-based motion refinement, the output of block-based BDOF is selected. Otherwise, the output of sample-based BDOF is selected. Since the window sizes used in sample-based BDOF and block-based BDOF are different, we may need to have one scaling factor in the comparison. The denominator can be changed to be one of statistical data used in BDOF process, e.g. pixel difference, gradients, and so on.

In another embodiment, the above methods can be combined together. For example, the final output is conditionally selected from one of the outputs of sample-based BDOF and block-based BDOF. If one of the motion refinements in sample-based BDOF or block-based BDOF cannot be determined (e.g. dividing by zero), we take the other as the final output. Otherwise (i.e., both of the motion refinements in sample-based BDOF and block-based BDOF being able to be determined), the final output is the weighted sum of the outputs of sample-based BDOF and block-based BDOF: In another example, the final output is conditionally selected from one of the outputs of sample-based BDOF and block-based BDOF, according to the motion refinements. If one of the products of motion refinement in sample-based BDOF or block-based BDOF is zero, we take the other as the final output. Otherwise (i.e., both products of the motion refinements in sample-based BDOF and block-based BDOF being non-zeros), the final output is the weighted sum of the outputs of sample-based BDOF and block-based BDOF. In another example, the final output is conditionally selected from one of the outputs of sample-based BDOF and block-based BDOF according to the motion directions of motion refinements. If the motion directions of motion refinements in sample-based BDOF and block-based BDOF are the same, the output of sample-based BDOF is used as the final output. Otherwise (i.e., the directions of motion refinement in sample-based BDOF and block-based BDOF being different), the final output is the weighted sum of the outputs of sample-based BDOF and block-based BDOF.

Since the gradients of one to-be-processed sample are the same in sample-based BDOF and block-based BDOF, we can directly combine the sample-based motion refinement and block-based motion refinement when applying the weighted sum of two outputs of sample-based BDOF and block-based BDOF in the above proposed methods, instead of combining the outputs of sample-based BDOF and block-based BDOF.

In another embodiment, one high-level syntax is added in the slice level, picture level or sequence level to indicate whether the proposed method is used or not. If the flag is equal to the first value, either sample-based BDOF or block-based BDOF is used. If the flag is equal to the second value, both of them are used together.

In another embodiment, the motion refinement of block-based BDOF in the above method can be replaced by averaging multiple motion refinements of sample-based BDOF. For example, the motion refinement of block-based BDOF can be derived by averaging 4 motion refinements of sample-based BDOF in one 2×2 block. In another example, the motion refinement of block-based BDOF can be derived by averaging 16 motion refinements of sample-based BDOF in one 4×4 block.

Figure 1B:
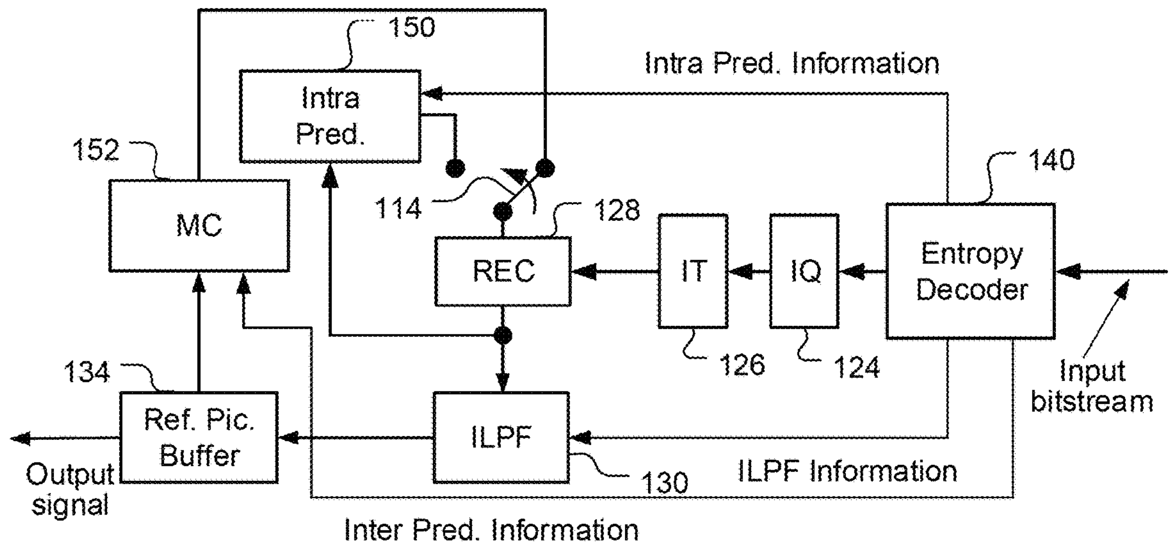
FIG. 1B is a diagram illustrating a decoder compatible with the encoding system of FIG. 1A.

Any of the foregoing proposed MV refinement methods using bi-directional prediction can be implemented in an inter/intra/prediction module of an encoder, and/or an inter/intra/prediction module of a decoder. For example, in the encoder side, the required MV refinement processing using bi-directional prediction based on decoder-side motion vector refinement (DMVR) or bi-directional Optical Flow (BDOF) can be implemented as part of the Inter-Pred. unit 112 FIG. 1A. However, the encoder may also use additional processing unit to implement the required processing. For the decoder side, the required MV refinement processing using bi-directional prediction based on decoder-side motion vector refinement (DMVR) or bi-directional Optical Flow (BDOF) can be implemented as part of the MC unit 152 as shown in FIG. 1B. However, the decoder may also use additional processing unit to implement the required processing. Alternatively, any of the proposed methods can be implemented as a circuit coupled to the inter/intra/prediction module of the encoder and/or the inter/intra/prediction module of the decoder, so as to provide the information needed by the inter/intra/prediction module. While the Inter-Pred. 112 in the encoder side and MC 152 in the decoder side are shown as individual processing units, they may correspond to executable software or firmware codes stored on a media," such as hard disk or flash memory, for a CPU (Central Processing Unit) or programmable devices (e.g. DSP (Digital Signal Processor) or FPGA (Field Programmable Gate Array))

Figure 6:
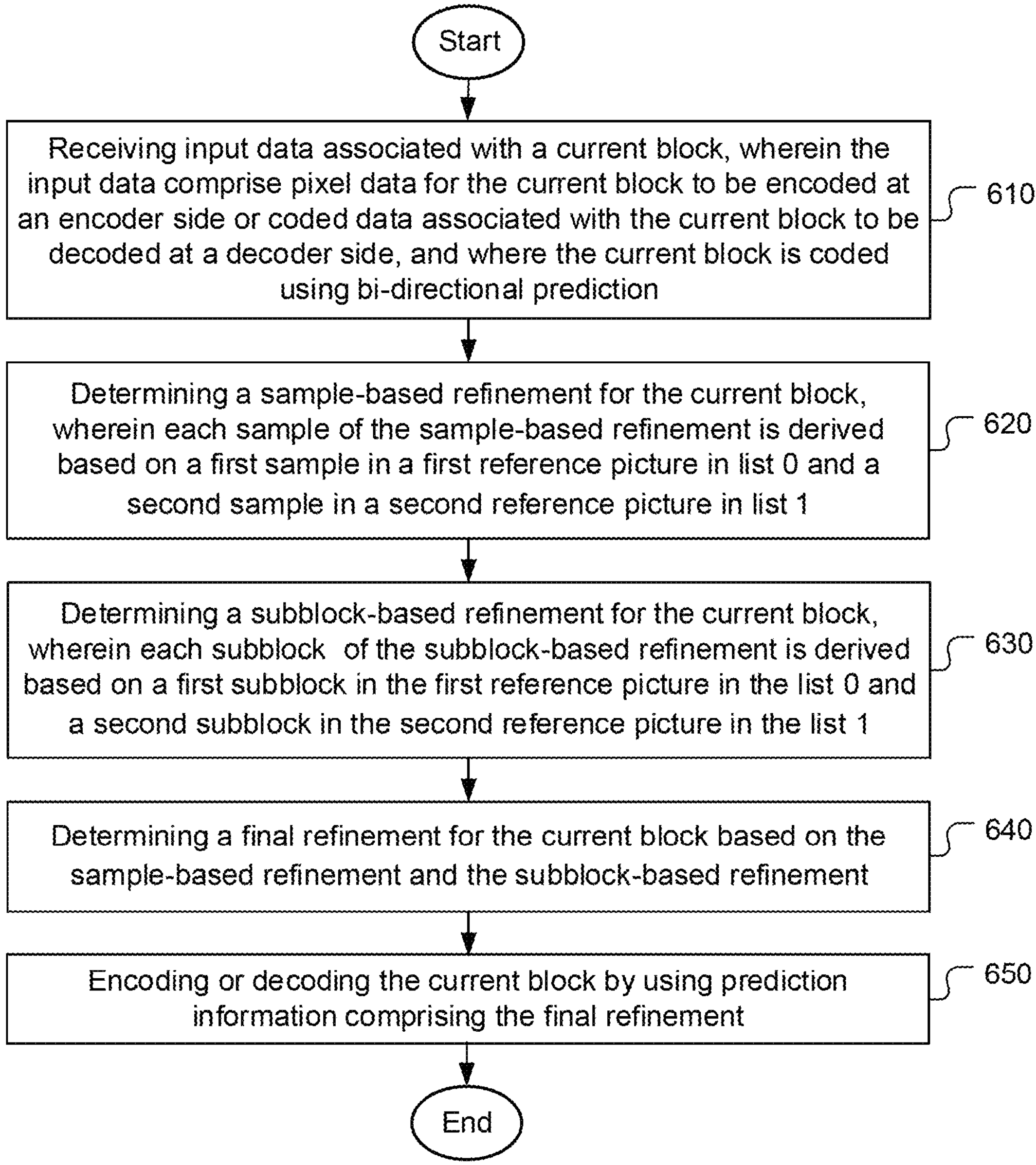
FIG. 6 illustrates an exemplary flowchart of a video coding (for example, encoding and/or decoding) system using bi-directional optical flow (BIO) to refine motion for a bi-direction predicted block according to an embodiment of the present invention.

FIG. 6 illustrates an exemplary flowchart of a video coding (for example, encoding and/or decoding) system using bi-directional optical flow (BIO) to refine motion for a bi-direction predicted block according to an embodiment of the present invention. The steps shown in the flowchart, as well as other flowcharts in this disclosure, may be implemented as program codes executable on one or more processors (e.g., one or more CPUs) at the encoder side and/or the decoder side. The steps shown in the flowchart may also be implemented based on hardware such as one or more electronic devices or processors arranged to perform the steps in the flowchart. According to this method, input data associated with a current block in a current picture is received in step 610, where the current block is coded (for example, encoded and/or decoded) using bi-direction prediction. A sample-based refinement is determined for the current block in step 620, wherein each sample of the sample-based refinement is derived based on a first sample in a first reference picture in list 0 and a second sample in a second reference picture in list 1. A subblock-based refinement is determined for the current block in step 630, wherein each subblock of the subblock-based refinement is derived based on a first subblock in the first reference picture in the list 0 and a second subblock in the second reference picture in the list 1. A final refinement is determined for the current block based on the sample-based refinement and the subblock-based refinement in step 640. The current block is encoded or decoded by using prediction information comprising the final refinement in step 650.

FIG. 7 illustrates an exemplary flowchart of a video coding (for example, encoding and/or decoding) system using bi-directional prediction to refine predictor for a bi-direction predicted block according to an embodiment of the present invention. According to this method, input data associated with a current block in a current picture is received in step 710, where the current block is coded (for example, encoded and/or decoded) using bi-direction prediction. One or more high-level syntaxes are signalled or parsed in step 720, wherein said one or more high-level syntaxes indicate whether non-equal distance reference pictures are allowed for bi-directional motion refinement. In response to said one or more high-level syntaxes indicating the non-equal distance reference pictures being allowed, a refined MV is determined for at least one block in the current picture based on a first reference picture in list 0 and a second reference picture in list 1 in step 730, and wherein a first picture distance between the first reference picture and the current picture and a second picture distance between the second reference picture and the current picture are different.

Said at least one block is encoded or decoded by using prediction information comprising the refined MV in step 740.

The flowcharts shown above are intended to illustrate an example of video coding according to the present invention. A person skilled in the art may modify each step, re-arranges the steps, split a step, or combine steps to practice the present invention without departing from the spirit of the present invention. In the disclosure, specific syntax and semantics have been used to illustrate examples to implement embodiments of the present invention. A skilled person may practice the present invention by substituting the syntax and semantics with equivalent syntax and semantics without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be one or more circuit circuits integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of video coding, the method comprising:

receiving input data associated with a current picture, wherein the input data comprise pixel data for the current picture to be encoded at an encoder side or coded data associated with the current picture to be decoded at a decoder side;

signalling or parsing one or more high-level syntaxes, wherein said one or more high-level syntaxes indicate whether non-equal distance reference pictures are allowed for bi-directional motion refinement;

in response to said one or more high-level syntaxes indicating the non-equal distance reference pictures being allowed, deriving a refined MV (Motion Vector) for at least one block in the current picture based on a first reference picture in list 0 and a second reference picture in list 1, and wherein a first picture distance between the first reference picture and the current picture and a second picture distance between the second reference picture and the current picture are different; and encoding or decoding said at least one block by using prediction information comprising the refined MV.

2. The method of claim 1, wherein said one or more high-level syntaxes comprise a first high-level syntax to indicate whether the non-equal distance reference pictures are allowed for the bi-directional motion refinement based on DMVR (Decoder-Side Motion Vector Refinement) and a second high-level syntax to indicate whether the non-equal distance reference pictures are allowed for the bi-directional motion refinement based on BDOF (Bi-Directional Optical Flow).

3. The method of claim 1, wherein said one or more high-level syntaxes are signalled in or parsed from a SPS (Sequence Parameter Set).

4. The method of claim 3, wherein one or more low-level syntaxes are signalled or parsed to indicate whether the non-equal distance reference pictures are allowed for bi-directional motion refinement at a lower level.

5. The method of claim 4, wherein said one or more low-level syntaxes are signalled or parsed at a picture level or a slice level.

6. The method of claim 4, wherein said one or more low-level syntaxes are signalled or parsed only in response to said one or more high-level syntaxes indicating the non-equal distance reference pictures being allowed.

7. An apparatus for video coding, the apparatus comprising one or more electronics or processors arranged to:

receive input data associated with a current picture, wherein the input data comprise pixel data for the current picture to be encoded at an encoder side or coded data associated with the current picture to be decoded at a decoder side;

signal or parse one or more high-level syntaxes, wherein said one or more high-level syntaxes indicate whether non-equal distance reference pictures are allowed for bi-directional motion refinement;

in response to said one or more high-level syntaxes indicating the non-equal distance reference pictures being allowed, derive a refined MV (Motion Vector) for at least one block in the current picture based on a first reference picture in list 0 and a second reference picture in list 1, and wherein a first picture distance between the first reference picture and the current picture and a second picture distance between the second reference picture and the current picture are different; and encode or decode said at least one block by using prediction information comprising the refined MV.

8. A method of video coding, the method comprising:

receiving input data associated with a current block, wherein the input data comprise pixel data for the current block to be encoded at an encoder side or coded data associated with the current block to be decoded at a decoder side, and where the current block is coded using bi-directional prediction;

determining a sample-based refinement for the current block, wherein each sample of the sample-based refinement is derived based on a first sample in a first reference picture in list 0 and a second sample in a second reference picture in list 1;

determining a subblock-based refinement for the current block, wherein each subblock of the subblock-based refinement is derived based on a first subblock in the first reference picture in the list 0 and a second subblock in the second reference picture in the list 1;

determining a final refinement for the current block based on the sample-based refinement and the subblock-based refinement; and encoding or decoding the current block by using prediction information comprising the final refinement.

9. The method of claim 8, wherein the final refinement corresponds to a weighted sum of the sample-based refinement and the subblock-based refinement.

10. The method of claim 8, wherein the final refinement is selected between the sample-based refinement and the subblock-based refinement.

11. The method of claim 8, wherein a high-level syntax is signalled at the encoder side or parsed at the decoder side, wherein the high-level syntax indicates whether the final refinement is allowed to be derived based on the sample-based refinement and the subblock-based refinement.

12. The method of claim 11, wherein the high-level syntax is signalled at the encoder side or parsed at the decoder side in a slice level, picture level or sequence level.

13. The method of claim 11, wherein a first motion refinement associated with the subblock-based refinement is derived from a second motion refinement associated with multiple samples of the sample-based refinement.

* * * * *